United States Patent
Tsyrganovich

(10) Patent No.: US 9,560,372 B2
(45) Date of Patent: Jan. 31, 2017

(54) DIRECTIONAL MOTION VECTOR FILTERING

(75) Inventor: Anatoliy Vasilevich Tsyrganovich, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 1760 days.

(21) Appl. No.: 12/979,107

(22) Filed: Dec. 27, 2010

(65) Prior Publication Data

US 2012/0163459 A1    Jun. 28, 2012

(51) Int. Cl.
*H04N 7/50* (2006.01)
*H04N 19/513* (2014.01)

(52) U.S. Cl.
CPC .................................. *H04N 19/513* (2014.11)

(58) Field of Classification Search
CPC ........ H04N 5/144; H04N 5/145; H04N 7/014; H04N 7/23677; H04N 19/00593; H04N 19/00583; H04N 19/0089
USPC .................................................. 375/240.16
See application file for complete search history.

(56) References Cited

U.S. PATENT DOCUMENTS

| | | | | |
|---|---|---|---|---|
| 5,012,524 A * | 4/1991 | Le Beau | ............... | G06T 7/0042 382/149 |
| 6,750,986 B1 * | 6/2004 | Yang | ........................ | H04N 1/58 358/462 |
| 2005/0128355 A1 * | 6/2005 | Kang | ..................... | H04N 5/144 348/606 |
| 2006/0182355 A1 * | 8/2006 | Shin | ..................... | H04N 19/176 382/236 |
| 2006/0228049 A1 * | 10/2006 | Gensolen | .................. | G06T 7/20 382/309 |
| 2007/0140347 A1 * | 6/2007 | Moon | ................... | G06T 3/4007 375/240.16 |
| 2010/0158362 A1 * | 6/2010 | Lang | ................. | G06F 17/30262 382/165 |

* cited by examiner

*Primary Examiner* — Obafemi Sosanya
(74) *Attorney, Agent, or Firm* — Seed IP Law Group LLP

(57) ABSTRACT

An appropriate motion vector to assign to a pixel in a digital video frame is performed by a comparison of motion vectors of particular surrounding pixels. Direction of at least one of color transition or color brightness transition in the digital video frame is detected to detect direction of object boundaries in the digital video frame. The particular surrounding pixels are selected and grouped (filtered) according to the detected object boundary direction at each pixel. A comparison of the motion vectors of the surrounding pixels then provides information on which group of pixels to assign a current pixel being processed based in part on how close the motion vectors of the surrounding groups match a group pixels to which the pixel being processed belongs.

20 Claims, 13 Drawing Sheets

FIG. 5C

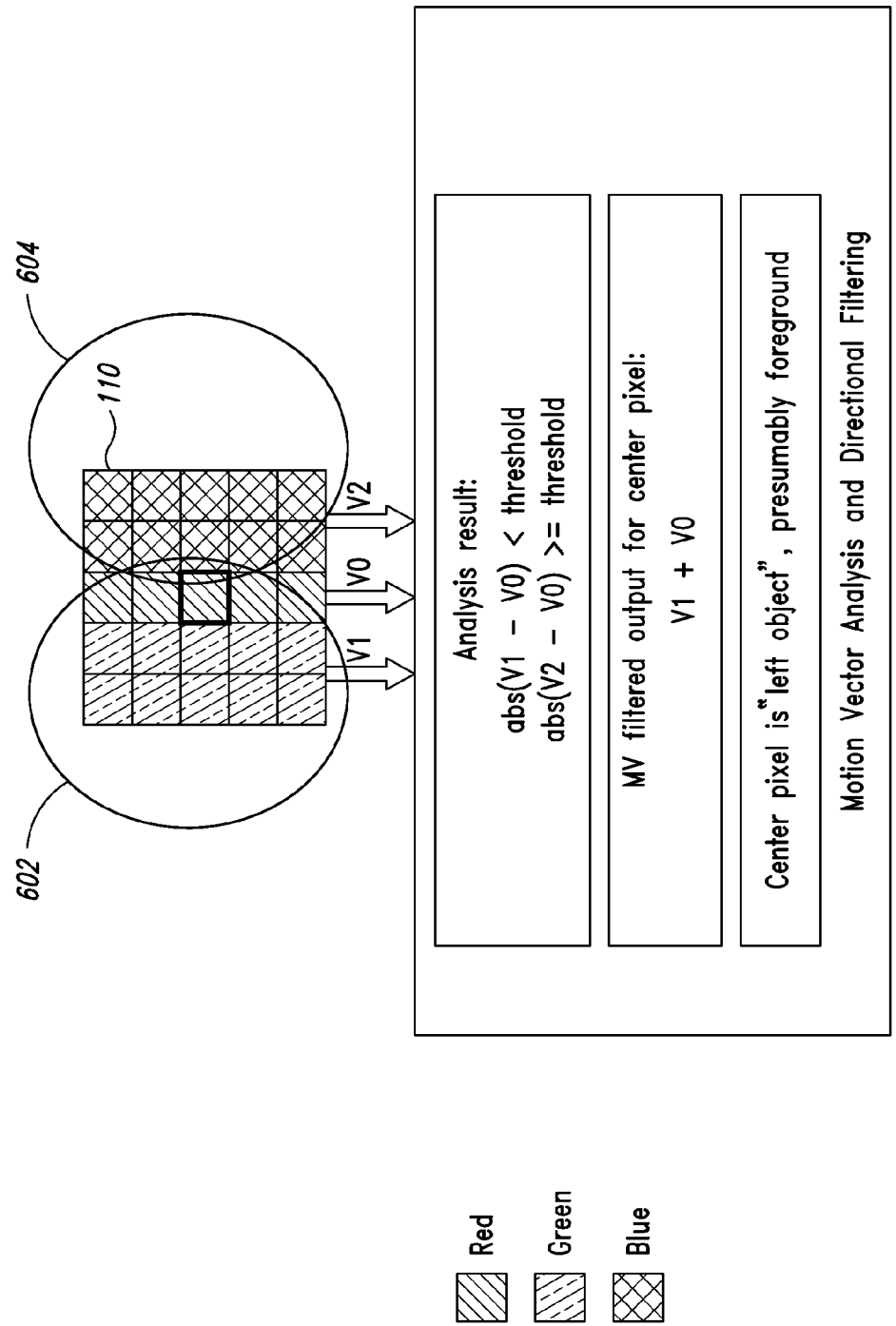

DIRECTIONAL MOTION VECTOR FILTERING

BACKGROUND

Technical Field

The present disclosure relates to digital video processing, and more particularly, to filtering of motion vectors.

Description of the Related Art

Digital video compression is used to reduce the quantity of data used to represent digital video images. Digital video compression and decompression schemes often result in inaccurate object motions appearing within the video due to a particular compression scheme used to achieve a large compression ratio, moving objects being blocked in a video frame by other objects, a very low bit rate requirement, and/or due to skipped or missing video frames. This is because in digital video compression, motion vector (MV) data based on estimated motion or estimated stillness of objects or picture fragments between frames of the digital video are used to replace actual originally captured data.

For example, in two adjacent digital video frames, finding the best correlation of a predefined picture fragment from one of the frames onto another frame results in an initial estimation of motion vectors related to the fragment. If the fragment is defined to be of a basic shape, for instance a square shape, the problem of finding an accurate MV arises when the shape comprises picture elements (pixels) from different objects moving in different directions and/or at different speeds. If a MV is assigned to a center pixel of the fragment and there are two objects in the fragment, there is a chance that the center pixel which belongs to one of the objects will be assigned to a MV corresponding to the other object.

BRIEF SUMMARY

To determine the appropriate motion vector to assign to a pixel in a digital video frame, a comparison of motion vectors of particular surrounding pixels is used. This is especially useful for determining motion vectors of pixels that compose or are near boundaries of various objects moving in different directions or speeds between the digital video frames. A given digital video frame is analyzed to determine the direction of object boundaries (i.e., determine in what general direction they are sloped). This is done by detecting direction of color transition or color brightness transition in the digital video frame. The particular surrounding pixels are selected and grouped according to the detected object boundary direction at each pixel. Filtering of the motion vectors is performed by comparison of the motion vectors of the surrounding pixels, which then provides information on which group of pixels to assign a current pixel being processed based in part on how close the motion vectors of the surrounding groups match a group pixels to which the pixel being process belongs. A filtered motion vector output is then provided for the pixel being processed based on which group of pixels the current pixel being processed was assigned.

BRIEF DESCRIPTION OF THE SEVERAL VIEWS OF THE DRAWINGS

FIG. 5C is an illustration of another example filter structure for directional motion vector filtering according to one embodiment.

FIG. 6A is a more detailed illustration of pre-filtered motion vector analysis according to the process of FIG. 3 for example motion vector comparisons.

DETAILED DESCRIPTION

Figure 1:
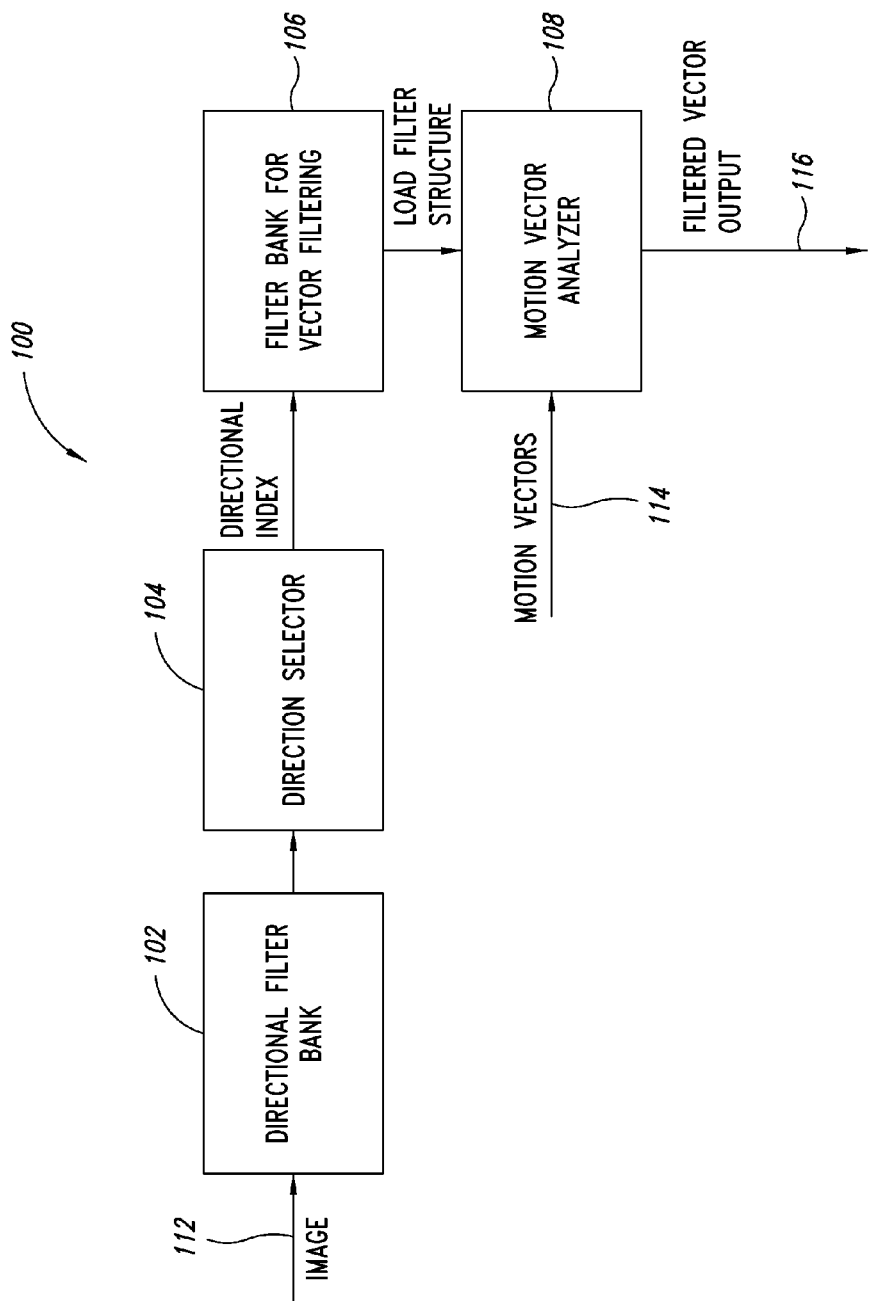
FIG. 1 shows a schematic diagram of an example system for directional motion vector filtering according to one embodiment.

FIG. 1 shows a schematic diagram of an example system 100 for directional motion vector filtering according to one embodiment. The system 100 is configured to filter and analyze motion vectors to reduce or eliminate incorrect motion vector assignment to objects represented in digital video frames. The systems and associated method is adaptive to image structure and may include two phases. The first phase is to detect direction of brightness and/or color transition in the digital video frames. In the second phase, motion vectors are separately filtered and analyzed according to the detected direction at each pixel position to be processed.

The following is a description of the parts and structure of the system 100. Following the description of the parts and structure of the system 100 will be a description of the operation of the system 100.

The system 100 includes a directional filter bank 102, a direction selector 104, a filter bank for vector filtering 106, and a motion vector analyzer 108. An image, such as a digital video frame 112, is input to the directional filter bank 102. The output of the directional filter bank 102 is coupled to input of the direction selector 104. The output of the direction selector 104 is coupled to the input of the filter bank for vector filtering 106. The inputs to the motion vector analyzer 108 include an output from the filter bank for vector filtering 106 and motion vectors 114 assigned to objects within the image 112. The output is a filtered vector 116.

Following is a description of an example operation of the system 100.

The directional filter bank 102 detects the direction of image gradients of the input image 112 to determine the direction of an object boundary. The direction of the object boundary is orthogonal to the direction of the gradient. For example, by performing spatial motion vector filtering of the input image 112, the directional filter bank 102 filters the image 112 such that object boundaries within the image 112 are associated with one of four directions: 0 degrees, 45 degrees, 90 degrees and 135 degrees. Areas of the image 112 may also be considered omni-directional if a particular direction is not detected to a certain degree of specificity.

The direction selector is coupled or otherwise communicatively connected to the directional filter bank 102. The direction selector selects the object boundaries associated with a particular direction for processing and assigns a corresponding directional index to those boundaries and may also assign an omni-directional index to areas a particular direction is not detected to a certain degree of specificity. This directional index is input to the filter bank for vector filtering 106 that is coupled or otherwise communicatively connected to the output of the direction selector 104. The motion vector filter structure corresponding to the assigned index is then selected from the filter bank for vector filtering 106 and loaded into the motion vector analyzer 108 along with information regarding a current block of pixels associated with the selected object boundaries associated with the assigned directional index. Also motion vectors 114 are input into the motion vector analyzer, including those being processed corresponding to the selected object boundaries associated with the assigned directional index.

The motion vector analyzer 108, which is coupled or otherwise communicatively connected to the filter bank for vector filtering 106, separately analyzes and filters motion vectors according to the detected direction and associated filter to associate a current pixel being processed with a particular object or area, and thus determine an appropriate motion vector for that pixel. This process is described in more detail below with reference to FIGS. 2 through 6E. The filtered vector output 116 is then output from the motion vector analyzer 108 such that it may be used in further digital video processing and/or image compression.

The system 100 repeats the above process for each object boundary associated with a particular direction (i.e., for each direction: 0 degrees, 45 degrees, 90 degrees and 135 degrees), for each omni-directional area, and for each pixel position to be processed within those areas. It should be noted that more or fewer directional categories, indexes and associated filters may be used in the gradient detection, directional filtering and motion vector analysis. For example, object boundaries within the image 112 may instead be associated with one of eight directions for finer granularity in the detection process.

Figure 2:
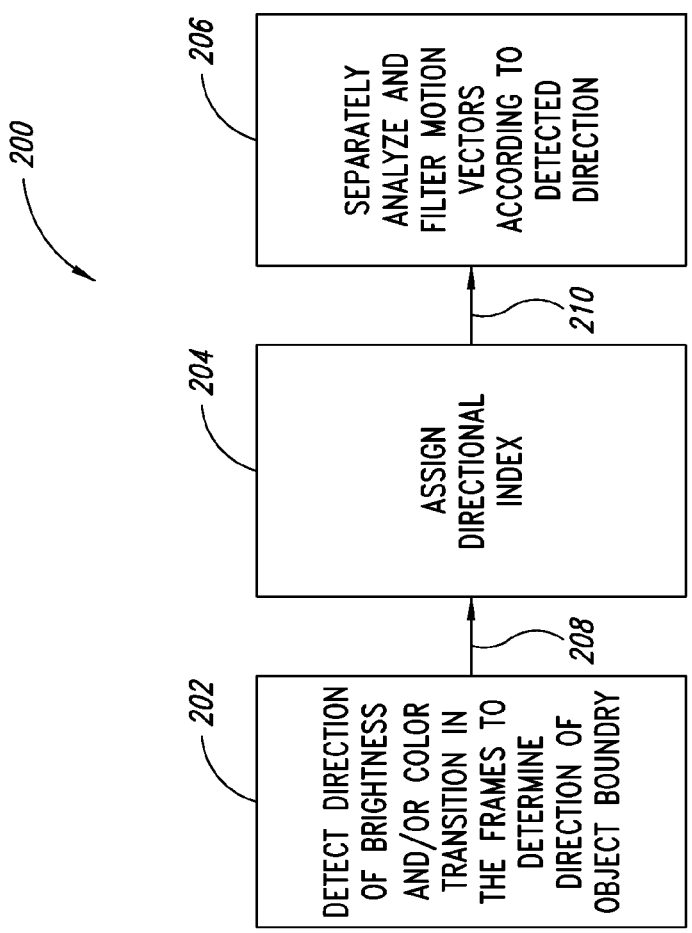
FIG. 2 is a flow chart showing an example process of directional motion vector filtering, according to one embodiment.

FIG. 2 is a flow chart showing an example process 200 of directional motion vector filtering, according to one embodiment. In particular, FIG. 2 illustrates process 200 that may be performed or implemented by, for example, one or more modules or components of the system for directional motion vector filtering shown in FIG. 1 or any combination of suitable hardware, firmware or software components or devices including those that are a part of or configure the computing environment of FIG. 7.

At 202, the process detects direction of either brightness changes, color transition, or both (i.e., gradient detection), in the frames to determine direction of an object's boundary. The process then proceeds to step 204 as indicated by arrow 208.

At 204 a directional index is assigned to the object boundary or area of the image. The process then proceeds to step 206, as indicated by arrow 210.

At 206, the process separately analyzes and filters motion vectors according to detected direction. The analyzing and filtering of motion vectors is performed for each object boundary detected, each omni-directional area, and each pixel within those areas. Alternatively, the analyzing and filtering of motion vectors may be performed for selected areas or objects, and each pixel within those areas.

Figure 4B:
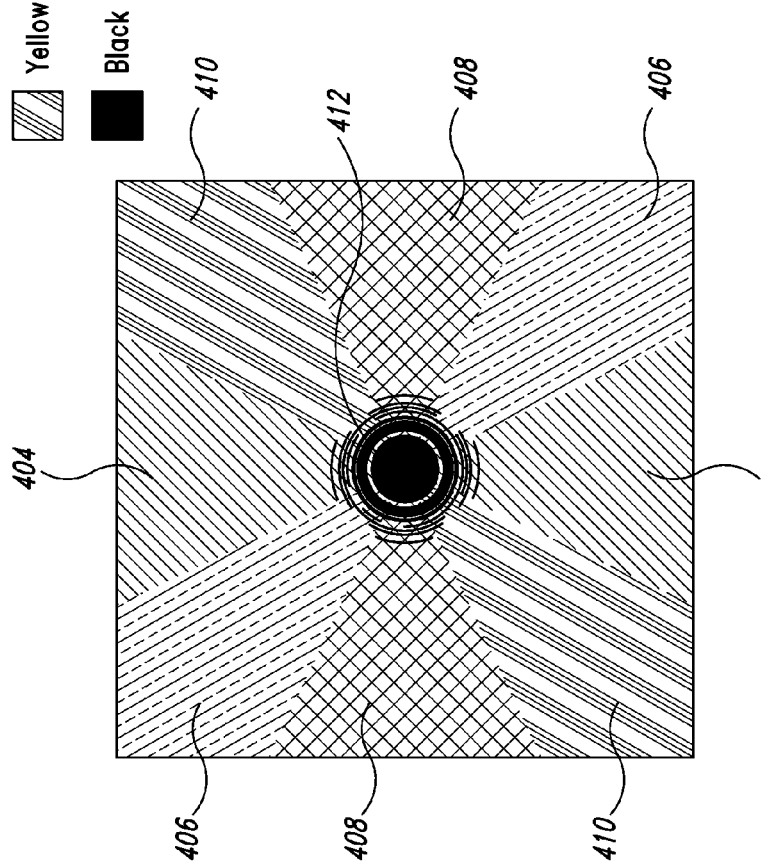
FIG. 4B is a diagram showing indexes assigned to the zone plate test pattern of FIG. 4A after performing gradient detection according a the process of FIG. 2.
Figure 4A:
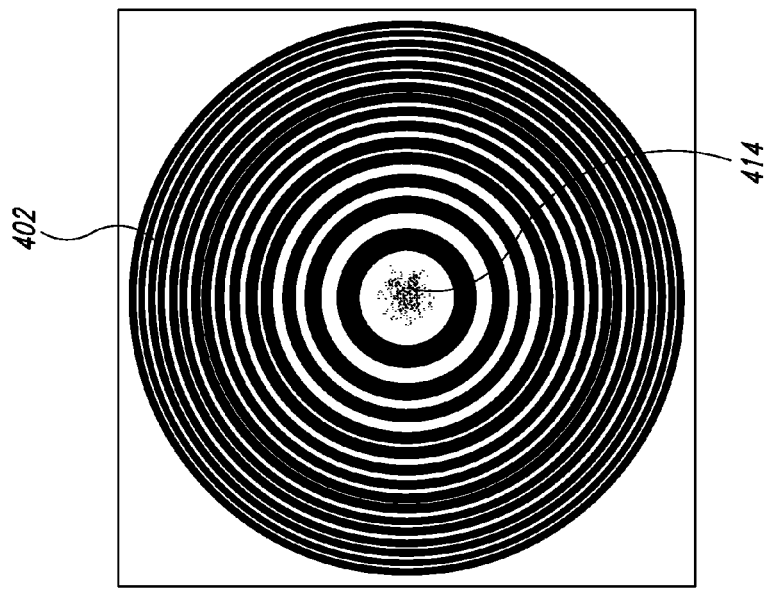
FIG. 4A is an example of a zone plate test pattern in a video frame on which gradient detection is to be performed.

FIG. 4A is an example of a zone plate test pattern in a video frame on which gradient detection is to be performed according to the process 200 of FIG. 2 described herein. The test pattern in the video frame is of a zone plate type having concentric circles 402 in order to provide object borders in all directions for testing purposes, but the video frame may include any pattern or image within a video sequence. Accordingly, the steps of process 200 are carried out on the zone plate test pattern of FIG. 4A.

FIG. 4B is a diagram showing indexes assigned to the zone plate test pattern of FIG. 4A after performing gradient detection according a the process of FIG. 2. In FIG. 4B, each directional index is assigned to a different color. The 0 degree directional index 404 is shown in red, the 45 degree directional index is shown green 406, the 90 degree directional index is shown in blue 408, and the 135 degree directional index 410 is shown in yellow. Also, the omni-directional index 412 (that index assigned to areas in which a particular direction is not detected to a certain degree of specificity) is shown in black. As shown in FIG. 4B, the object boundary areas defined by the concentric circles 402 of FIG. 4A change color as their direction changes following the perimeter of each concentric circle. Black is shown in FIG. 4B corresponding to the omni-directional index areas of FIG. 4A (i.e. the area 414 near the center of the diagram where there was not a discernable object boundary detected).

Figure 3:
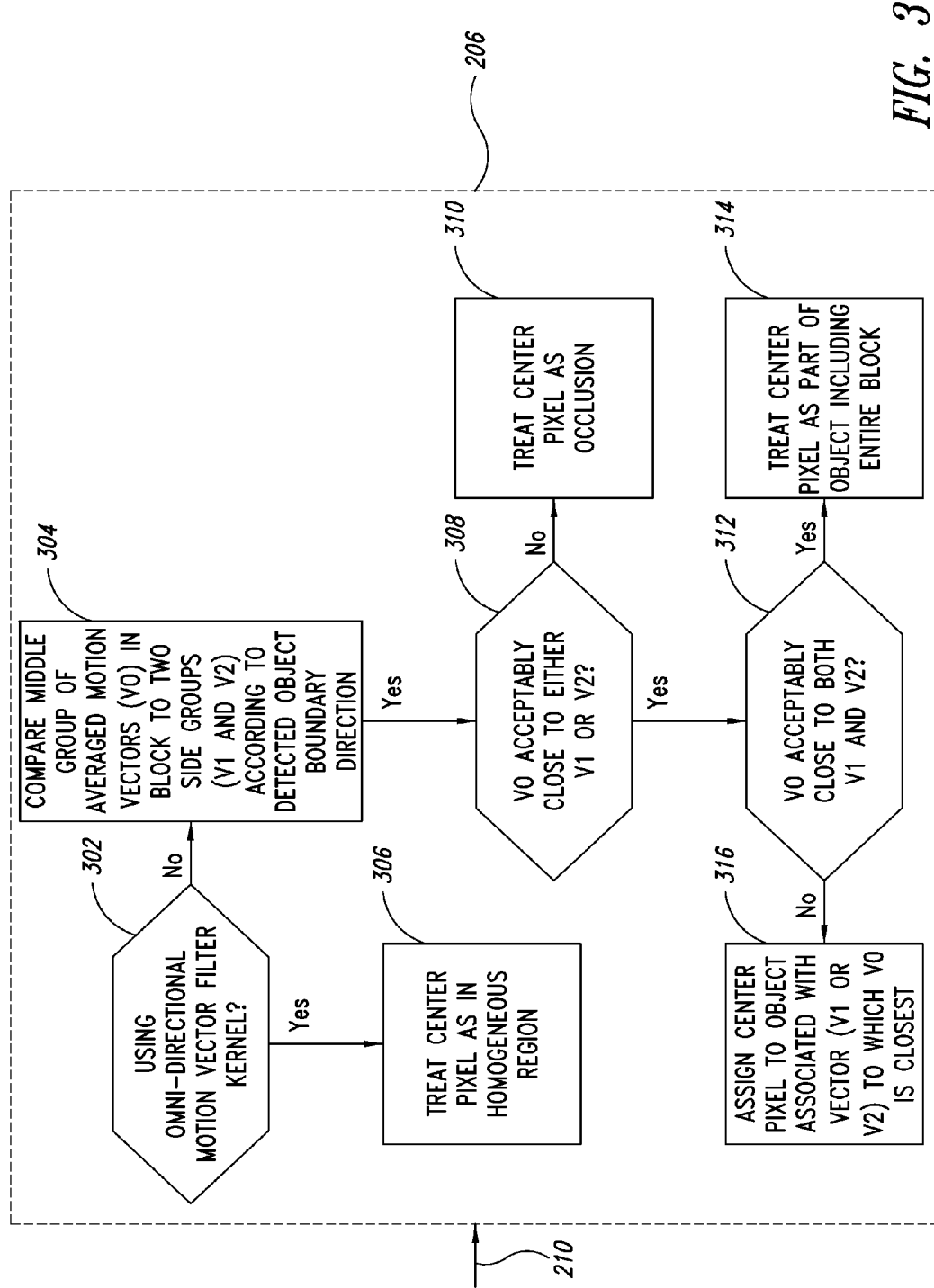
FIG. 3 is a flow chart showing an example process including the motion vector analysis portion of the directional motion vector filtering of FIG. 2, according to one embodiment.

FIG. 3 is a flow chart showing an example process including the analyzing and filtering 206 of motion vectors of FIG. 2 in more detail.

At 302, the process determines whether an omni-directional motion vector filter kernel is being used. This may occur, for example, when the current pixel being processed is in an area where there was not a discernable object boundary detected as described above.

At 304, if the omni-directional motion vector filter kernel is not being used, the process compares a middle group of averaged motion vectors (V0) in a block of pixels to two side groups (V1 and V2) according to the detected object boundary direction and the corresponding motion vector filter corresponding to the directional index of the detected object boundary direction.

Figure 5A:
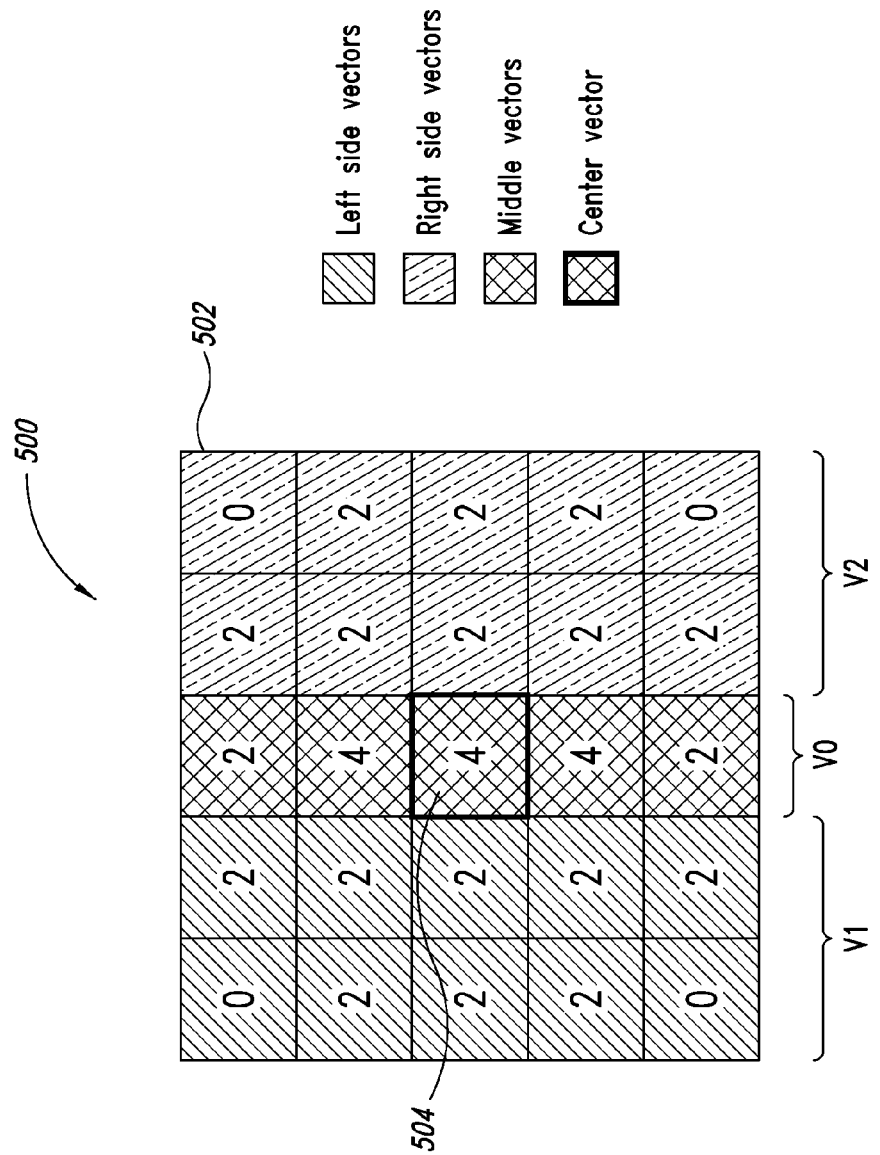
FIG. 5A is an illustration of an example filter structure for directional motion vector filtering according to one embodiment.

For example, shown in FIG. 5A is an illustration of an example filter structure 500 for a directional motion vector filter according to a motion vector filter kernel corresponding to the 0 degree directional index (i.e., horizontal image gradient). In the present example of FIG. 5A an adaptive 5 pixel by 5 pixel (5×5) kernel is used to filter motion vectors. V1, V0 and V2 are each smoothed or averaged motion vector values of the motion vectors whose example coefficients are indicated in the corresponding pixels within the 5×5 block 502. In particular, V0 corresponds to the averaged values of the motion vectors of the middle column of pixels in the block 502, V1 corresponds to the averaged values of the motion vectors of the two columns of pixels on the left side (side 1) of the block 502 and V2 corresponds to the averaged values of the motion vectors of the two columns of pixels on the right side (side 2) of the block 502. The center pixel 504 corresponds to the pixel currently being processed (i.e., the pixel for which an appropriate motion vector is being determined or for which an object in the image or video frame must be associated).

As mentioned above, there are four adaptive directional filters and one omni-directional filter. Thus there are five filter structures used, one corresponding to each filter. As explained above, FIG. 5A is an illustration of an example filter structure for a directional motion vector filter according to a motion vector filter kernel corresponding to the 0 degree directional index (i.e., horizontal image gradient). Rotating the same filter structure of FIG. 5A by 90 degrees provides the filter structure filter according to a motion vector filter kernel corresponding to the 90 degree directional index (i.e., vertical image gradient).

Figure 5B:
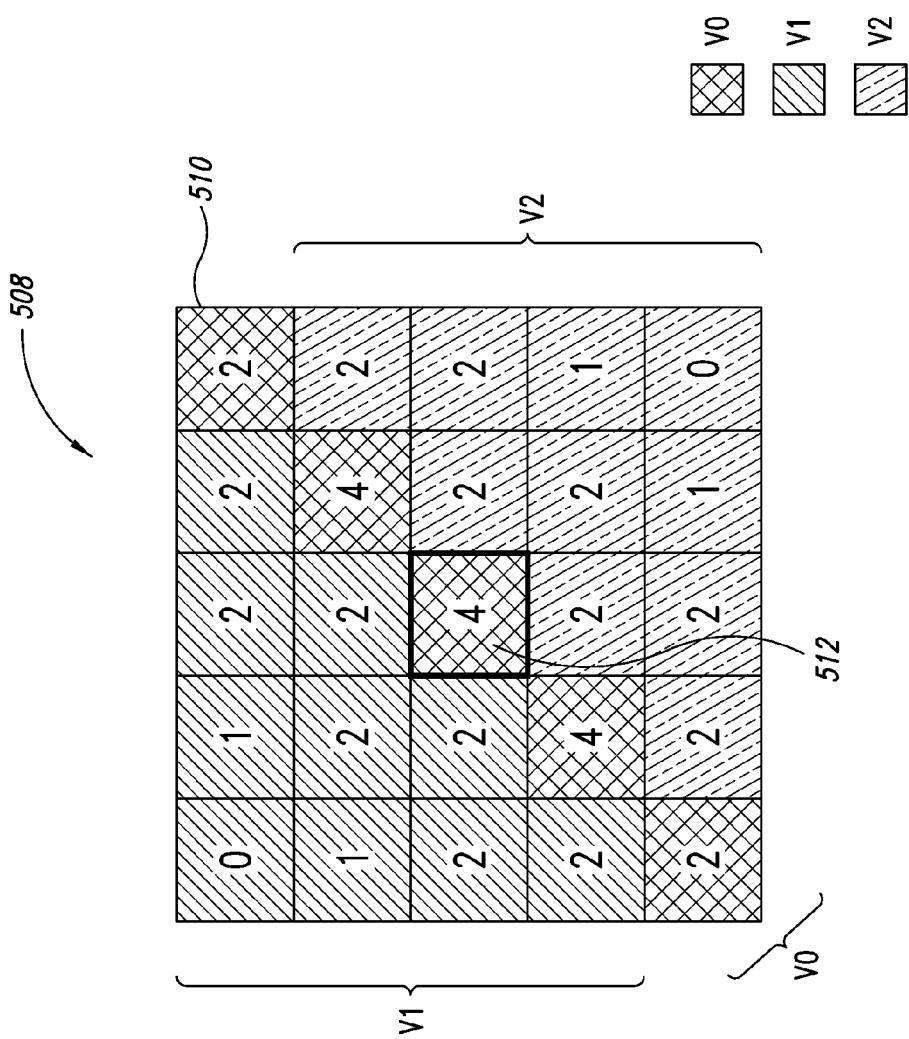
FIG. 5B is an illustration of another example filter structure for directional motion vector filtering according to one embodiment.

FIG. 5B is an illustration of an example filter structure 508 for a directional motion vector filter according to a motion vector filter kernel corresponding to the 135 degree directional index (i.e., diagonal image gradient). Note that V0 corresponds to the motion vectors of the pixels traversing diagonally across the block 510, V1 corresponds to the motion vectors of the pixels in the block 510 above those of V0, and V2 corresponds to the motion vectors of the pixels in the block 510 below those of V0. The center pixel 512 corresponding to the pixel currently being processed is in the center of the block 510. Vertically flipping the same filter structure 508 of FIG. 5B provides the filter structure according to a motion vector filter kernel corresponding to the 45 degree directional index (i.e., oppositely diagonal image gradient).

Figure 5C:
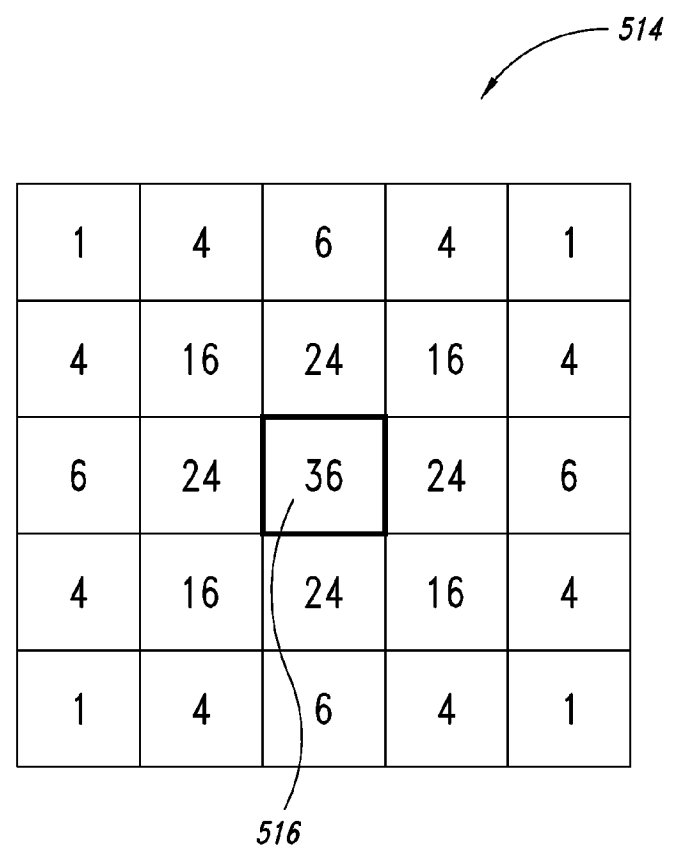

FIG. 5C is an illustration of an example filter structure 514 for directional motion vector filtering according to a motion vector filter kernel for the omni-directional filter. For example, the motion vector filter kernel for the omni-directional filter may be a two dimensional (2D) round McClellan (or frequency transformation) type filter, as understood by those skilled in the relevant art. The center pixel 516 corresponding to the pixel currently being processed is in the center of the block 514, as in the other filter structures.

Referring again to FIG. 3, if the omni-directional motion vector filter kernel is being used, at 306, the example filter structure 514 of FIG. 5C is used and the center pixel treated as in homogeneous region. Such an example appears in FIG. 6E, where there is no analysis performed for the omni-directional index and the motion vector filtered output is the value v of the center pixel.

Once the middle group of averaged motion vectors (V0) in a block of pixels is compared to the two side groups (V1 and V2) according to the detected object boundary direction and the corresponding motion vector filter, at 308, the process determines whether V0 is acceptably close to either V1 or V2. The threshold values used in determining whether V0 is acceptably close to either V1 or V2 may be selected according to any number of criteria including, but not limited to, desired accuracy, processing ability, system performance and operating conditions.

Figure 6B:
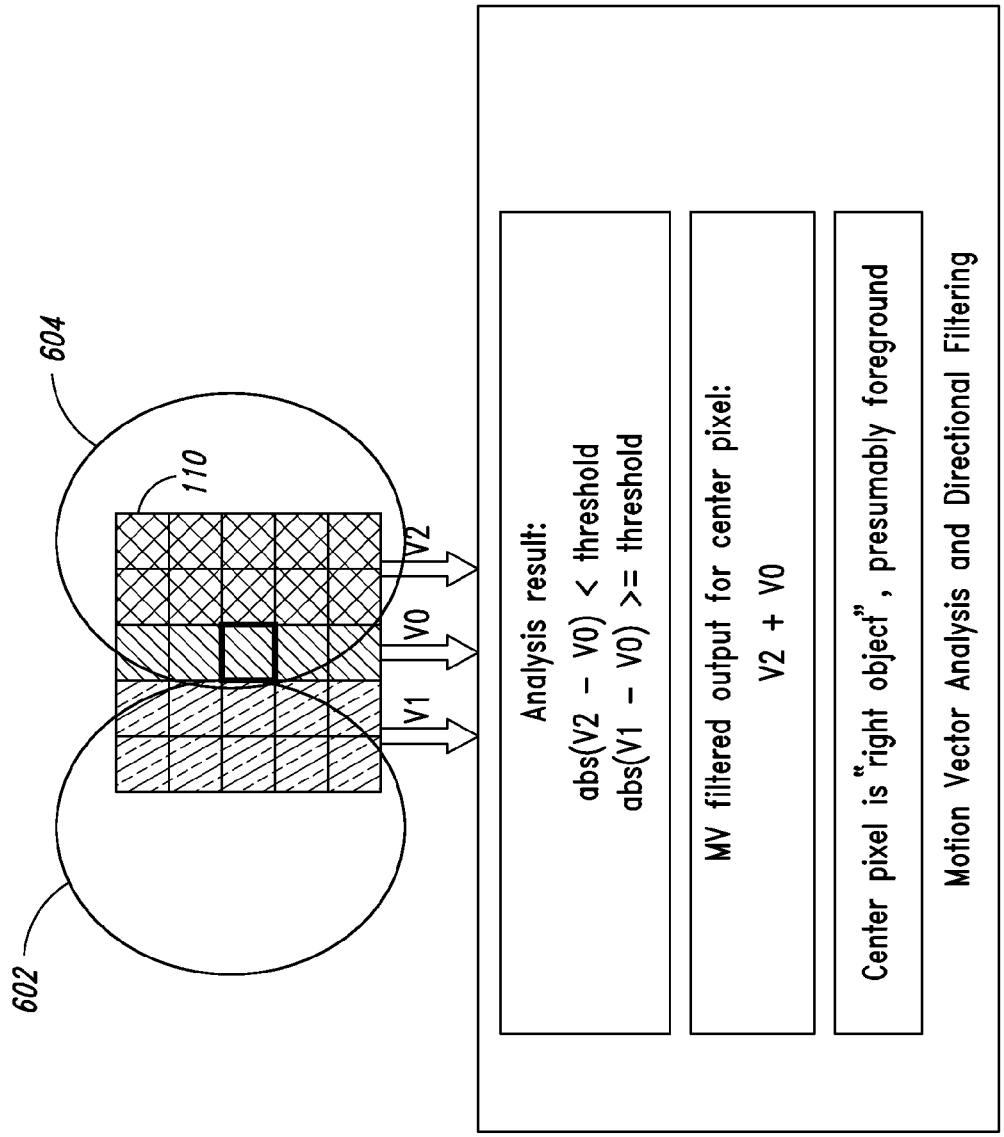
FIG. 6B is another more detailed illustration of pre-filtered motion vector analysis according to the process of FIG. 3 for example motion vector comparisons.
Figure 6C:
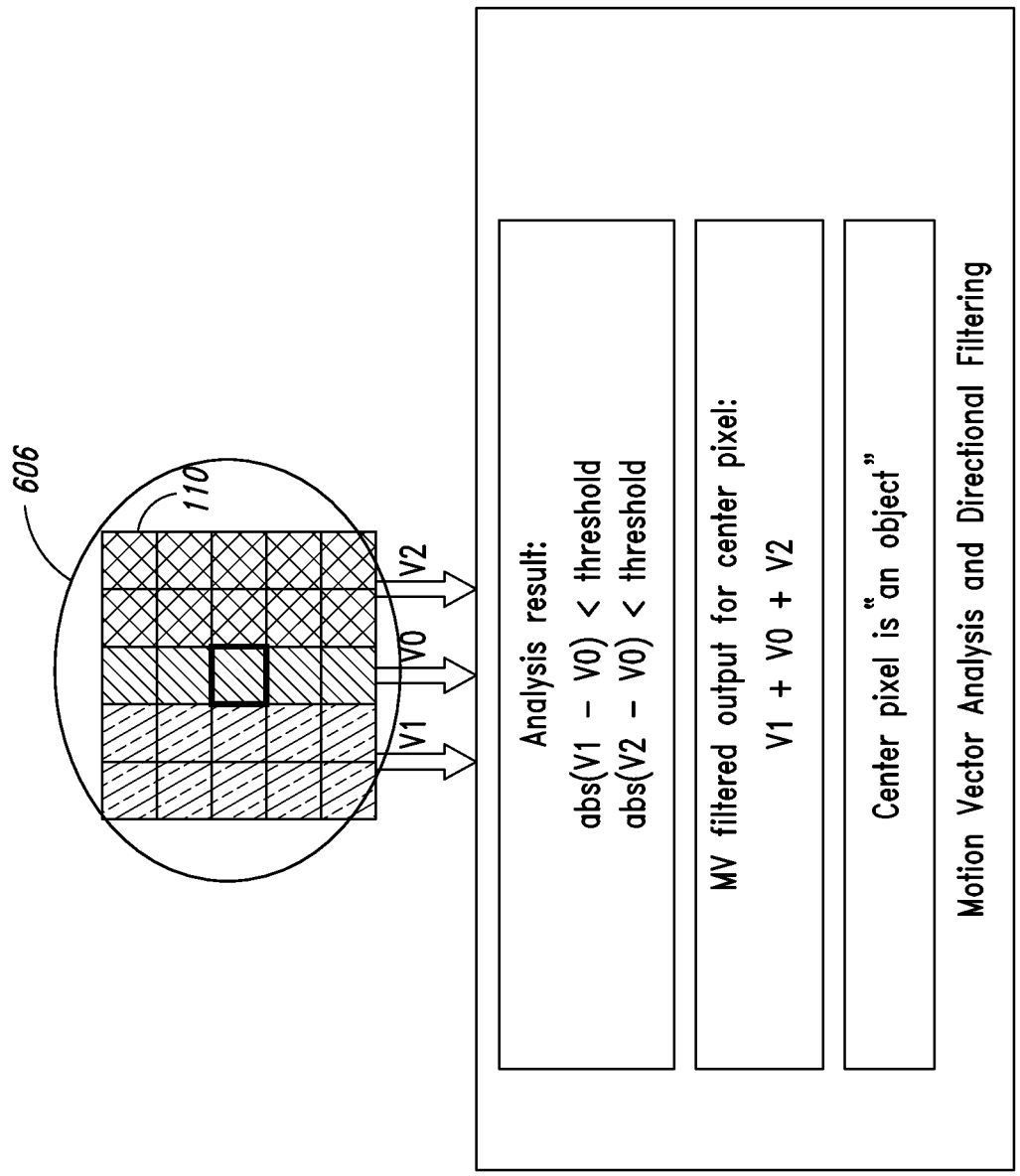
FIG. 6C is another more detailed illustration of pre-filtered motion vector analysis according to the process of FIG. 3 for example motion vector comparisons.
Figure 6D:
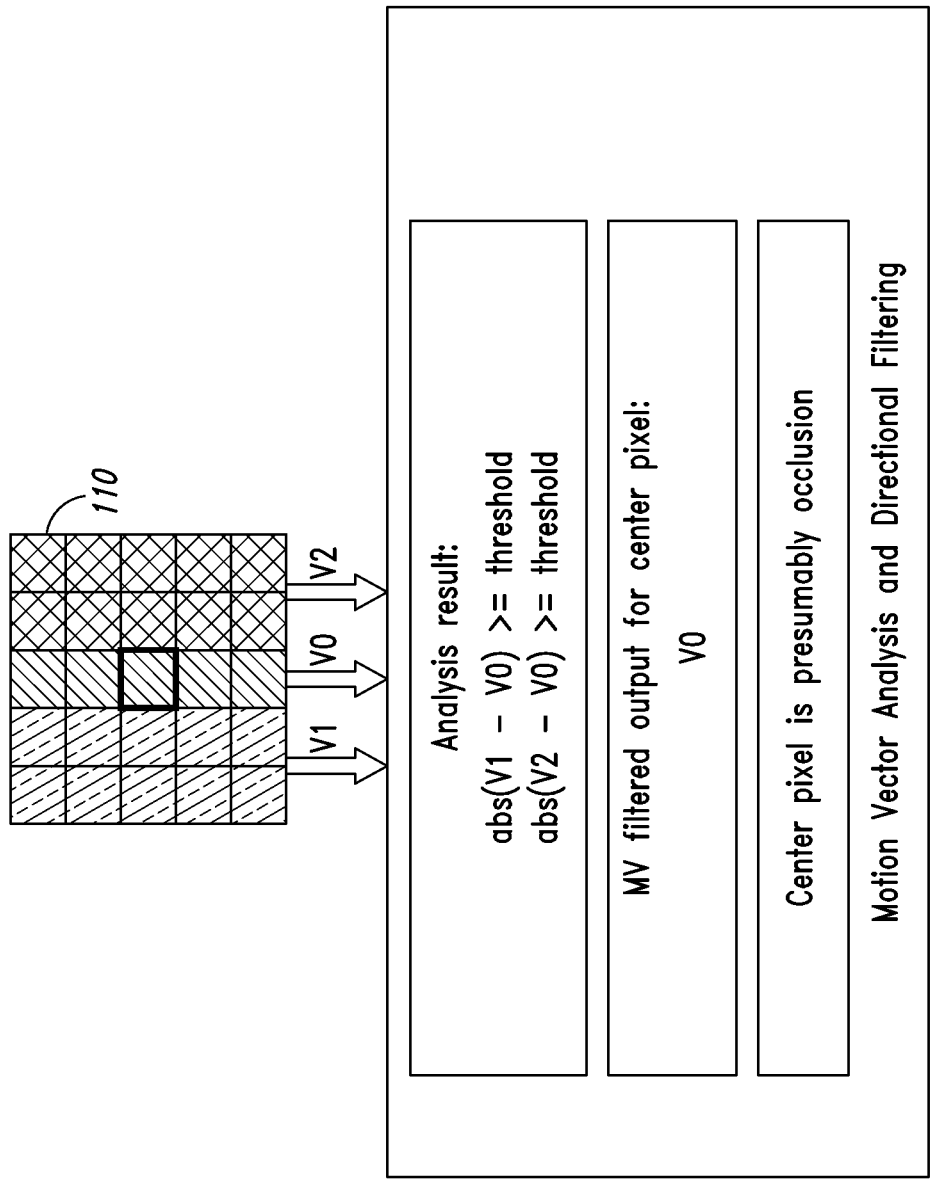
FIG. 6D is another more detailed illustration of pre-filtered motion vector analysis according to the process of FIG. 3 for example motion vector comparisons.
Figure 6E:
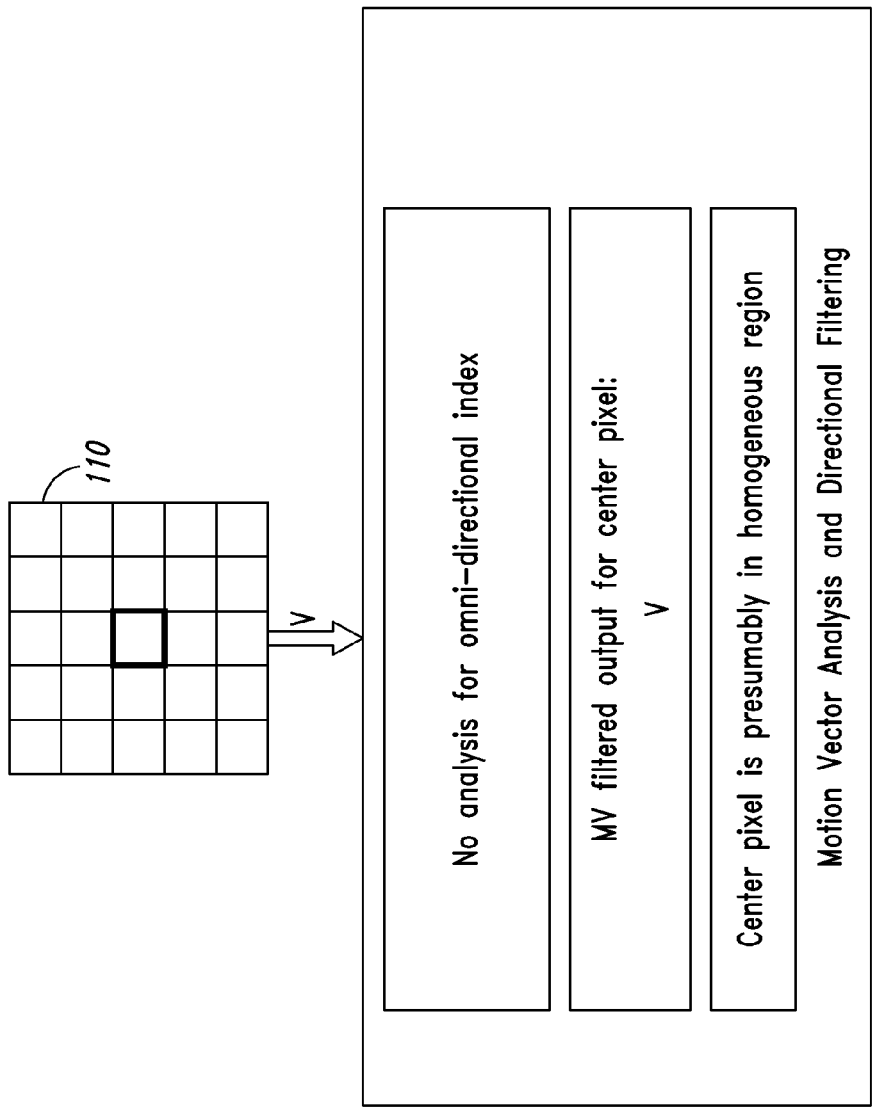
FIG. 6E is another more detailed illustration of pre-filtered motion vector analysis according to the process of FIG. 3 when using an omni-directional motion vector filter kernel.

At 310, If V0 is not acceptably close to either V1 or V2, then the center pixel is treated as an occlusion and is not associated with the motion vector of any object. This is based on the principle that the closer V0 is to V1 or V2, the more likely that V0 is associated with the object associated with V1 or V2. However, if the V0 is not acceptably close to either V1 or V2, then it is likely an occlusion and not a part of any object associated with V1 or V2. This is illustrated in the example shown in FIG. 6D, which shows a more detailed illustration of pre-filtered motion vector analysis according to the case when V0 is not acceptably close to either V1 or V2. For example, shown in FIG. 6D is the analysis wherein the absolute value of the difference of V1 and V0 is greater than or equal to the threshold ((abs(V1−V0)>=threshold) and the absolute value of the difference of V2 and V0 is also greater than or equal to the threshold (abs(V2−V0)>=threshold), resulting in the center pixel of the block of pixels 110 not being associated with the motion vector of any object in the image. Thus, the filtered output for the center pixel in this case is V0.

At 312, if it had been determined at 308 that V0 is acceptably close to either V1 or V2, then it is determined whether V1 is acceptably close to both V1 and V2.

At 316, if it had been determined at 312 that V0 is not acceptably close to both V1 and V2, then the center pixel is assigned to the object associated with the vector (V1 or V2) to which V0 is closest. This is also based on the principle, as stated above, that the closer V0 is to V1 or V2, the more likely that V0 is associated with the object associated with V1 or V2 (whichever V0 is closest to). This case is illustrated in FIGS. 6A and 6B, which show a more detailed illustration of motion vector analysis and directional filtering occurring within the motion vector analyzer 108 according to the process of FIG. 3 for various example motion vector comparisons. For example, shown in FIG. 6A is the analysis wherein the absolute value of the difference of V1 and V0 is less than the threshold ((abs(V1−V0)<threshold) and the absolute value of the difference of V2 and V0 is greater than or equal to the threshold (abs(V2−V0)>=threshold) resulting in the center pixel of the block of pixels 110 being assigned to the "left object" 602 (the object associated with V1, to which V0 is closest). Thus, the filtered output for the center pixel is V1+V0.

In an opposite case, shown in FIG. 6B is the analysis wherein the absolute value of the difference of V2 and V0 is less than the threshold ((abs(V2−V0)<threshold) and the absolute value of the difference of V1 and V0 is greater than or equal to the threshold (abs(V1−V0)>=threshold) resulting in the center pixel of the block of pixels 110 being assigned to the "right object" 604 (the object associated with V2, to which V0 is closest in this case). Accordingly, the filtered output for the center pixel is V2+V0. In both cases, the object to which the center pixel is associated is presumed to be in the foreground.

At 314, if it had been determined at 312 that V0 is acceptably close to both V1 and V2, then the center pixel is treated as part of an object including the entire block of pixels. In other words, the center pixel is assigned to an object associated with both the vectors V1 and V2. This is illustrated in FIG. 6C, which shows a more detailed illustration of pre-filtered motion vector analysis according to the case where V0 is acceptably close to both V1 and V2. For example, shown in FIG. 6A is the analysis wherein the absolute value of the difference of V1 and V0 is less than the threshold ((abs(V1−V0)<threshold) and the absolute value of the difference of V2 and V0 is also less than the threshold (abs(V2−V0)<threshold) resulting in the center pixel of the block of pixels 110 being assigned to the "object" 606 (including the entore block of pixels). Thus, the filtered output for the center pixel is V1+V0+V2.

The process above is repeated for each object boundary associated with a particular direction (i.e., for each direction:

0 degrees, 45 degrees, 90 degrees and 135 degrees), for each omni-directional area, and for each pixel position to be processed within those areas until the entire image is processed and the motion vectors are assigned accordingly for each pixel.

Figure 7:
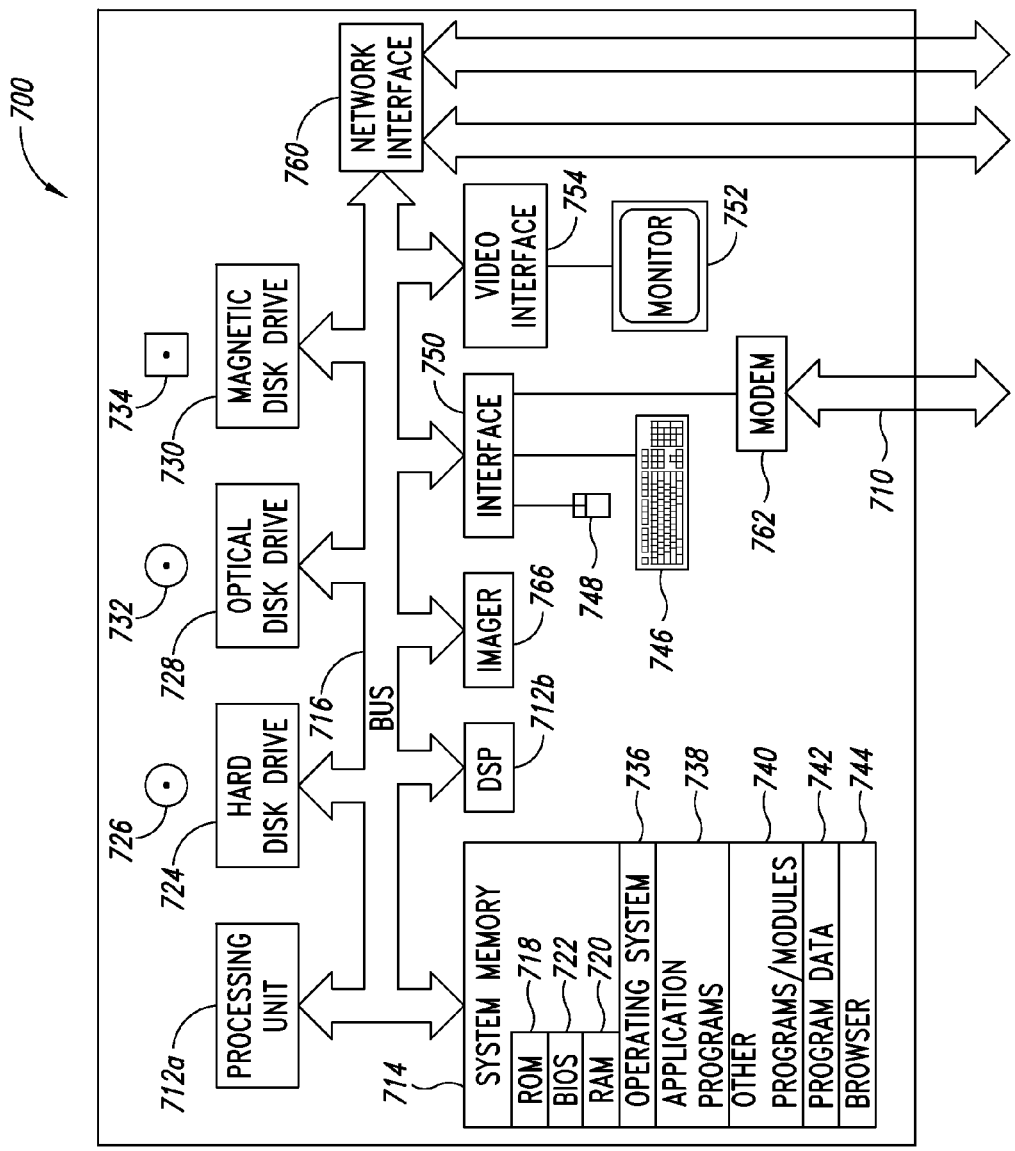
FIG. 7 is a schematic diagram of a computing environment in which directional motion vector filtering may be implemented or of which it may be a part.

FIG. 7 is a schematic diagram of computing environment in which directional motion vector filtering may be implemented or of which it may be a part. For example, process 200 described above in conjunction with FIGS. 2 and 3 may be performed or implemented by one or more modules or components of the system for directional motion vector filtering shown in FIG. 1 which may be implemented by any combination of suitable hardware, firmware or software components or devices including those that are a part of, or configure, the computing environment of FIG. 7.

The computing environment 700 will at times be referred to in the singular herein, but this is not intended to limit the embodiments to a single device since in typical embodiments there may be more than one computer system or device involved. Unless described otherwise, the construction and operation of the various blocks shown in FIG. 7 are of conventional design. As a result, such blocks need not be described in further detail herein, as they will be understood by those skilled in the relevant art.

The computing environment 700 may include one or more processing units 712a, 712b (collectively 712), a system memory 714 and a system bus 716 that couples various system components including the system memory 714 to the processing units 712. The processing units 712 may be any logic processing unit, such as one or more central processing units (CPUs) 712a, digital signal processors (DSPs) 712b, digital video or audio processing units such as coder-decoders (codecs) or compression-decompression units, application-specific integrated circuits (ASICs), field programmable gate arrays (FPGAs), etc. The system bus 716 can employ any known bus structures or architectures, including a memory bus with memory controller, a peripheral bus, and a local bus. The system memory 714 includes read-only memory ("ROM") 718 and random access memory ("RAM") 720. A basic input/output system ("BIOS") 722, which can form part of the ROM 718, contains basic routines that help transfer information between elements within the computing environment 700, such as during start-up.

The computing environment 700 may include a hard disk drive 724 for reading from and writing to a hard disk 726, an optical disk drive 728 for reading from and writing to removable optical disks 732, and/or a magnetic disk drive 730 for reading from and writing to magnetic disks 734. The optical disk 732 can be a CD-ROM, while the magnetic disk 734 can be a magnetic floppy disk or diskette. The hard disk drive 724, optical disk drive 728 and magnetic disk drive 730 may communicate with the processing unit 712 via the system bus 716. The hard disk drive 724, optical disk drive 728 and magnetic disk drive 730 may include interfaces or controllers (not shown) coupled between such drives and the system bus 716, as is known by those skilled in the relevant art. The drives 724, 728 and 730, and their associated computer-readable storage media 726, 732, 734, may provide nonvolatile and non-transitory storage of computer readable instructions, data structures, program modules and other data for the computing environment 700. Although the depicted computing environment 700 is illustrated employing a hard disk 724, optical disk 728 and magnetic disk 730, those skilled in the relevant art will appreciate that other types of computer-readable storage media that can store data accessible by a computer may be employed, such as magnetic cassettes, flash memory, digital video disks ("DVD"), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 712a.

Program modules can be stored in the system memory 714, such as an operating system 736, one or more application programs 738, other programs or modules 740 and program data 742. Application programs 738 may include instructions that cause the processor(s) 712 to perform directional motion vector filtering and receive, store and play digital video generated by directional motion vector filtering or on which directional motion vector filtering will be performed. Other program modules 740 may include instructions for handling security such as password or other access protection and communications encryption. The system memory 714 may also include communications programs, for example, a Web client or browser 744 for permitting the computing environment 700 to access and exchange data including digital video with sources such as Web sites of the Internet, corporate intranets, extranets, or other networks and devices as described herein, as well as other server applications on server computing systems. The browser 744 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft of Redmond, Wash.

While shown in FIG. 7 as being stored in the system memory 714, the operating system 736, application programs 738, other programs/modules 740, program data 742 and browser 744 can be stored on the hard disk 726 of the hard disk drive 724, the optical disk 732 of the optical disk drive 728 and/or the magnetic disk 734 of the magnetic disk drive 730.

An operator can enter commands and information into the computing environment 700 through input devices such as a touch screen or keyboard 746 and/or a pointing device such as a mouse 748, and/or via a graphical user interface in order to receive, process, store and send digital video on which directional motion vector filtering has been or will be performed as described herein. Other input devices can include a microphone, joystick, game pad, tablet, scanner, etc. These and other input devices are connected to one or more of the processing units 712 through an interface 750 such as a serial port interface that couples to the system bus 716, although other interfaces such as a parallel port, a game port or a wireless interface or a universal serial bus ("USB") can be used. A monitor 752 or other display device is coupled to the system bus 716 via a video interface 754, such as a video adapter which may be configured to perform directional motion vector filtering of the video. The computing environment 700 can include other output devices, such as speakers, printers, etc.

The computing environment 700 can operate in a networked environment using logical connections to one or more remote computers and/or devices. For example, the computing environment 700 can operate in a networked environment using logical connections to one or more other computing systems, mobile devices and other service providers or information servers that provide the digital video in streaming format or other electronic delivery methods. Communications may be via a wired and/or wireless network architecture, for instance wired and wireless enterprise-wide computer networks, intranets, extranets, telecommunications networks, cellular networks, paging networks, and other mobile networks.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other contexts, not necessarily the exemplary context of motion compensation and video compression. It will be understood by those skilled in the art that, although the embodiments described above and shown in the figures are generally directed to the context of motion compensation and video compression, applications related to reconstructing current, previous or other video frames for which a set of applicable motion vectors is available, for example, may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving digital video data and motion vector information associated with the digital video data;
    detecting direction of at least one of color transition or brightness transition in a digital video frame of the digital video data;
    detecting direction of slope of an object boundary in a digital video frame of the digital video data based on the detected direction of the at least one of color transition or brightness transition;
    filtering motion vectors of selected pixels associated with the object boundary according to the detected direction of the object boundary, the filtering of the motion vectors including: selecting a block of pixels associated with a first detected direction,
    partitioning the block of the selected pixels into a middle section, a first side section and a second side section in a manner corresponding to the first detected direction,
    calculating an average middle section motion vector value based on motion vector values of pixels of the middle section,
    calculating an average first side section motion vector value based on motion vector values of pixels of the first side section,
    calculating an average second side section motion vector value based on motion vector values of pixels of the second side section,
    comparing the average middle section motion vector value to the average first side section motion vector value and the average second side section motion vector value, and
    performing the motion vector filtering based on the comparing; and
    providing a filtered vector output resulting from the filtering of the motion vectors.

2. The method of claim 1 further comprising assigning a directional index to a block of pixels associated with the detected direction of the at least one of the color transition or the color brightness transition.

3. The method of claim 2 wherein the directional index corresponds to one of a predetermined number of directions.

4. The method of claim 1 further comprising detecting a plurality of directions of one or more object boundaries in the digital video frame.

5. The method of claim 1 wherein the detecting the direction of at least one of color transition or color brightness transition in the digital video frame comprises executing spatial motion vector filtering of motion vectors of the digital video frame.

6. The method of claim 1 wherein the performing motion vector filtering based on the comparing comprises: determining, based on the comparing, whether a center pixel of the selected block of pixels is to be assigned to an object associated with the motion vector values of pixels of the first side section, to an object associated with the motion vector values of pixels of the second side section, to an object associated with both the motion vector values of pixels of the first side section and second side section, or to no object.

7. The method of claim 6 further comprising: assigning the center pixel to a selected object according to the determining; and outputting a motion vector filtered output according to assigning the center pixel to a selected object.

8. The method of claim 7 further comprising: outputting a motion vector filtered output according to assigning the pixel to a selected object.

9. The method of claim 1 further comprising repeating the selecting, partitioning, all the calculating steps, the comparing, and the performing motion vector filtering according to a second, third and fourth detected direction.

10. The method of claim 1 wherein the direction detected corresponds to an omni-directional area of the digital video frame.

11. The method of claim 1 wherein the digital video data is received by a mobile device.

12. The method of claim 1 wherein the digital video data is in a compressed format.

13. The method of claim 1 wherein the digital video data is in an uncompressed format.

14. A device for providing a filtered vector output comprising:
    a direction selector configured to assign an object boundary slope direction to boundaries of an object within a digital video frame;
    a filter bank including vector filter structures, the filter bank coupled to the direction selector;
    a motion vector analyzer coupled to the filter bank and configured to assign a pixel to the object represented in the digital video frame based on a comparison of averaged motion vectors of surrounding pixels using a filter structure from the filter bank, the surrounding pixels being partitioned into at least two sections, a first section and a second section, each of the two sections being associated with a first detected direction by the direction selector, the motion vector analyzer calculating an average first section motion vector value based on motion vector values of pixels of the first section, calculating an average second section motion vector value based on motion vector values of pixels of the second section, the comparison being carried out by comparing the average first section motion vector value to the average second section motion vector value; and a memory coupled to the filter bank and motion vector analyzer, the memory being configured to store motion vectors associated with the digital video frame.

15. The device of claim 14, wherein the direction selector is configured to assign an object boundary slope direction to boundaries of an object within the digital video frame by being configured to select the boundaries associated with a particular slope direction for processing and to assign a corresponding directional index to those boundaries.

16. The device of claim 14, wherein direction selector is configured to designate the pixel as omni-directional based on a particular direction not being detected to a certain degree of specificity for the pixel.

17. A non-transitory computer readable storage medium, having computer executable instructions thereon, that when executed by a computer processor cause the following method to be performed:

receiving digital video data and motion vector information associated with the digital video data;

detecting direction of at least one of color transition or color brightness transition in a digital video frame of the digital video data;

detecting direction of slope of an object boundary in a digital video frame of the digital video data based on the detected direction of the at least one of color transition or color brightness transition; filtering motion vectors of selected pixels associated with the object boundary according to the detected direction of the object boundary, wherein the filtering of the motion vectors of the selected pixels associated with the object boundary comprises: selecting a block of pixels associated with a first detected direction;

partitioning the block of the selected pixels into a middle section, a first side section and a second side section in a manner corresponding to the first detected direction, calculating an average middle section motion vector value based on motion vector values of pixels of the middle section, calculating an average first side section motion vector value based on motion vector values of pixels of the first side section, calculating an average second side section motion vector value based on motion vector values of pixels of the second side section, comparing the average middle section motion vector value to the average first side section motion vector value and the average second side section motion vector value, and performing the motion vector filtering based on the comparing; and providing a filtered vector output resulting from the filtering of the motion vectors.

18. The non-transitory computer readable storage medium of claim 17 wherein the computer executable instructions thereon, when executed by a computer processor, further cause performing motion vector filtering based on the comparing to be performed.

19. The device of claim 14, wherein the motion vector analyzer coupled to the filter bank is configured to: select a block of pixels associated with a first detected direction selected by the direction selector; partition the block of the selected pixels into a middle section, a first side section and a second side section in a manner corresponding to the first detected direction; calculate an average middle section motion vector value based on motion vector values of pixels of the middle section; calculate an average first side section motion vector value based on motion vector values of pixels of the first side section;

calculate an average second side section motion vector value based on motion vector values of pixels of the second side section; determine whether the filter structure from the filter bank is an omni-directional motion vector filter due to a discernable object boundary not being detected by the direction selector; and if the determination is the filter structure from the filter bank is not an omni-directional motion vector, compare the average middle section motion vector value to the average first side section motion vector value and the average second side section motion vector value.

20. The device of claim 18, wherein the comparison of the average middle section motion vector value to the average first side section motion vector value and the average second side section motion vector value is according to the assigned object boundary slope direction.

* * * * *

UNITED STATES PATENT AND TRADEMARK OFFICE
CERTIFICATE OF CORRECTION

PATENT NO. : 9,560,372 B2  
APPLICATION NO. : 12/979107  
DATED : January 31, 2017  
INVENTOR(S) : Anatoliy Vasilevich Tsyrganovich Page 1 of 1

It is certified that error appears in the above-identified patent and that said Letters Patent is hereby corrected as shown below:

In the Claims

Column 11, Lines 35-36:
"transition or color brightness transition; filtering motion vector vehicles" should read, --transition or color brightness transition;
    filtering motion vector vehicles--.

Column 11, Lines 40-41:
"boundary comprises: selecting a block of pixels associated with a first detected direction" should read, --boundary comprises:
    selecting a block of pixels associated with a first detected direction;--.

Column 11, Line 45:
"detected direction," should read, --detected direction;--.

Column 11, Line 48:
"middle section," should read, --middle section;--.

Column 12, Line 3:
"first side section," should read, --first side section;--.

Column 12, Line 6:
"of the side section," should read, --of the side section; and--.

Column 12, Line 10:
"vector value," should read, --vector value;--.

Column 12, Lines 11-12:
"performing the motion vector filtering based on the comparing; and" should be removed from the patent.

Signed and Sealed this  
Eleventh Day of April, 2017

Michelle K. Lee  
*Director of the United States Patent and Trademark Office*